(12) United States Patent
Nishigaki et al.

(10) Patent No.: US 6,775,395 B2
(45) Date of Patent: Aug. 10, 2004

(54) OBJECT RECOGNITION SYSTEM

(75) Inventors: Morimichi Nishigaki, Wako (JP); Tomoyoshi Aoki, Wako (JP); Hiromitsu Yuhara, Wako (JP); Masakazu Saka, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 475 days.

(21) Appl. No.: 09/783,613

(22) Filed: Feb. 15, 2001

(65) Prior Publication Data

US 2001/0028729 A1 Oct. 11, 2001

(30) Foreign Application Priority Data

Mar. 27, 2000 (JP) ........................................ 2000-086192

(51) Int. Cl.⁷ .............................. G06K 9/00; G08G 1/00; G08G 1/16; G08G 1/17; G08G 1/054
(52) U.S. Cl. ........................ 382/104; 382/106; 382/154; 340/901; 340/903; 340/937
(58) Field of Search ................................ 382/104, 106, 382/154; 340/901, 903, 937

(56) References Cited

U.S. PATENT DOCUMENTS

| | | | |
|---|---|---|---|
| 5,304,980 A | * 4/1994 | Maekawa | 340/435 |
| 5,589,908 A | * 12/1996 | Irie | 396/51 |
| 5,610,993 A | * 3/1997 | Yamamoto | 382/124 |
| 5,956,424 A | * 9/1999 | Wootton et al. | 382/192 |
| 6,122,597 A | * 9/2000 | Saneyoshi et al. | 701/301 |
| 6,125,191 A | * 9/2000 | Mashimo et al. | 382/104 |
| 6,370,261 B1 | * 4/2002 | Hanawa | 382/104 |
| 6,370,262 B1 | * 4/2002 | Kawabata | 382/106 |
| 6,487,303 B1 | * 11/2002 | Yamaguchi et al. | 382/103 |

FOREIGN PATENT DOCUMENTS

| | | |
|---|---|---|
| DE | 100 29 423 A1 | 1/2001 |
| EP | 0 874 331 A2 | 10/1998 |
| JP | 7-83655 | 3/1995 |
| JP | 7-225126 | 8/1995 |
| JP | 9-79821 | 3/1997 |
| JP | 2000-19259 | 1/2000 |
| JP | 2001-004368 | 1/2001 |

OTHER PUBLICATIONS

Nishigaki, M.; Saka, M.; Aoki, T.; Yuhara, H.; Kawai, M., Fail Output Algorithm of Vision Sensing, Intelligent Vehicles Symposium, 2000. IV 2000. Proceedings of the IEEE, Oct. 3–5, 2000, Page(s): 581–584.*

* cited by examiner

Primary Examiner—Leo Boudreau
Assistant Examiner—Hussein Akhavannik
(74) Attorney, Agent, or Firm—Arent Fox PLLC

(57) ABSTRACT

An object recognition system having at least two image sensors and a controller that is adapted for measuring the distance from the system to a physical object with respect to respective windows of a n image captured by the sensors. The controller is further programmed to form clusters by uniting adjacent windows that have similar measure distances. The controller is programmed to judge whether each of the clusters is valid or invalid based on the attributes of the cluster and to recognize an object based on the clusters judged to be valid.

8 Claims, 11 Drawing Sheets

Fig. 3
(a)
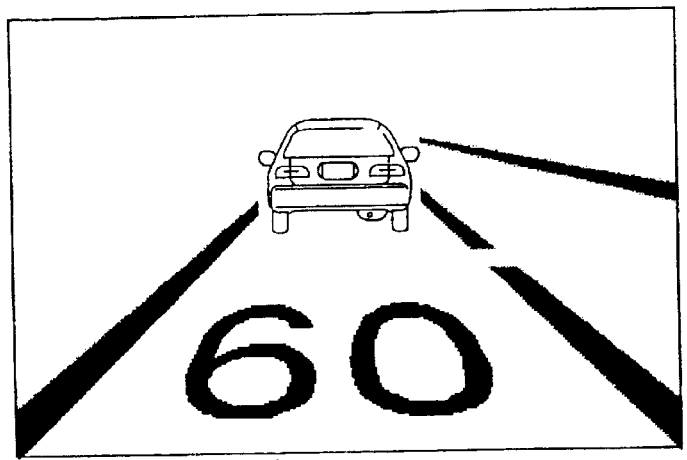
(b)
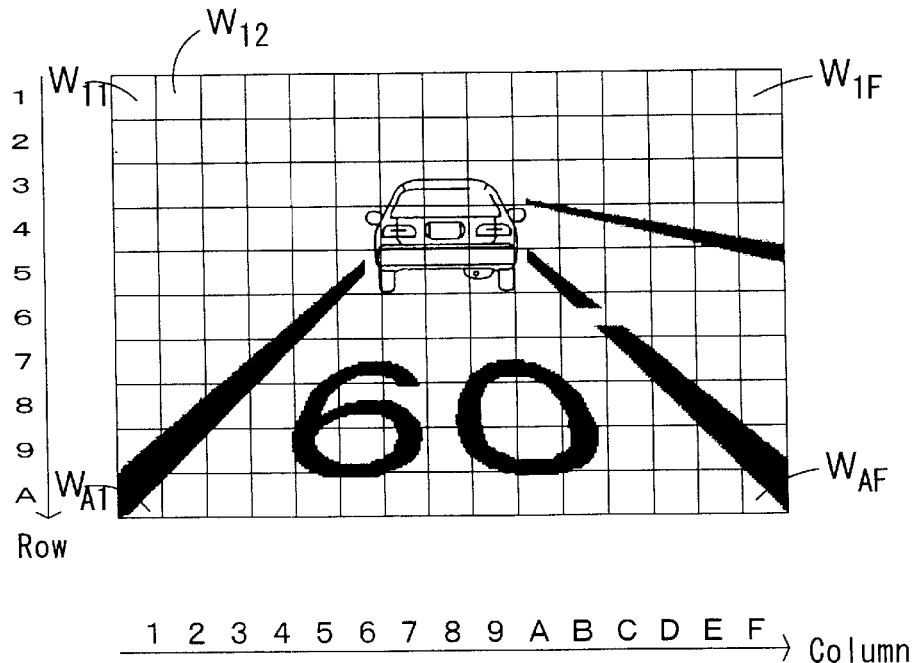

(a)

(b)

Distance Conversion Table

| Distance Range | | Distance Label |
|---|---|---|
| S 1 | 0 m ≦ Distance < 2 m | 1 |
| S 2 | 2 m ≦ Distance < 5 m | 2 |
| S 3 | 5 m ≦ Distance < 9 m | 3 |
| S 4 | 9 m ≦ Distance < 1 4 m | 4 |
| S 5 | 1 4 m ≦ Distance < 2 0 m | 5 |
| S 6 | 2 0 m ≦ Distance < 2 7 m | 6 |

Fig. 5

(the unit of the distance=0.1m)

| Distance | Distance Label | Distance | Distance Label |
|---|---|---|---|
| 0 | 0 | 20 | 9 |
| 1 | 1 | 21 | 9 |
| 2 | 2 | 22 | 9 |
| 3 | 3 | 23 | 9 |
| 4 | 4 | 24 | 9 |
| 5 | 4 | 25 | 9 |
| 6 | 5 | 26 | 9 |
| 7 | 5 | 27 | 10 |
| 8 | 6 | 28 | 10 |
| 9 | 6 | 29 | 10 |
| 10 | 6 | 30 | 10 |
| 11 | 7 | 31 | 10 |
| 12 | 7 | 32 | 10 |
| 13 | 7 | 33 | 10 |
| 14 | 7 | 34 | 10 |
| 15 | 8 | 35 | 10 |
| 16 | 8 | 36 | 11 |
| 17 | 8 | . | . |
| 18 | 8 | . | . |
| 19 | 8 | . | . |

FIG. 6

| 5 | 7 | 9 | 15 | 12 | 24 | 10 | 10 |
|---|---|---|----|----|----|----|----|
| 25 | 16 | 24 | 26 | 25 | 5 | 8 | 23 |
| 1 | 18 | 22 | 17 | 15 | 9 | 5 | 12 |
| 25 | 11 | 23 | 5 | 19 | 10 | 26 | 3 |
| 25 | 21 | 3 | 18 | 7 | 18 | 25 | 24 |
| 21 | 15 | 26 | 20 | 20 | 4 | 6 | 4 |
| 21 | 17 | 2 | 14 | 13 | 5 | 10 | 9 |
| 22 | 16 | 11 | 13 | 12 | 8 | 7 | 19 |

(a) Mesured Distance

| 3 | 3 | 4 | 5 | 4 | 6 | 4 | 4 |
|---|---|---|---|---|---|---|---|
| 6 | 5 | 6 | 6 | 6 | 3 | 3 | 6 |
| 1 | 5 | 6 | 5 | 5 | 4 | 3 | 4 |
| 6 | 4 | 6 | 3 | 5 | 4 | 6 | 2 |
| 6 | 6 | 2 | 5 | 3 | 5 | 6 | 6 |
| 6 | 5 | 6 | 6 | 6 | 2 | 3 | 2 |
| 6 | 5 | 2 | 5 | 4 | 3 | 4 | 4 |
| 6 | 5 | 4 | 4 | 4 | 3 | 3 | 5 |

(b) Distance Label

| 31 | 31 | 41 | 51 | 42 | 61 | 43 | 43 |
|----|----|----|----|----|----|----|----|
| 62 | 52 | 63 | 63 | 63 | 32 | 32 | 64 |
| 11 | 52 | 63 | 53 | 53 | 44 | 32 | 45 |
| 64 | 46 | 63 | 33 | 53 | 44 | 65 | 21 |
| 64 | 64 | 22 | 54 | 34 | 55 | 65 | 65 |
| 64 | 56 | 66 | 66 | 66 | 23 | 35 | 24 |
| 64 | 56 | 25 | 57 | 47 | 36 | 48 | 48 |
| 64 | 56 | 49 | 49 | 47 | 36 | 36 | 58 |

W84 W85 W75

(c) Cluster Label

| 31 | 31 | 41 | 51 | 42 | 61 | 43 | 43 |
|----|----|----|----|----|----|----|----|
| 62 | 52 | 63 | 63 | 63 | 32 | 32 | 64 |
| 11 | 52 | 63 | 53 | 53 | 44 | 32 | 45 |
| 64 | 46 | 63 | 33 | 53 | 44 | 65 | 21 |
| 64 | 64 | 22 | 54 | 34 | 55 | 65 | 65 |
| 64 | 56 | 66 | 66 | 66 | 23 | 35 | 24 |
| 64 | 56 | 25 | 57 | 49 | 36 | 48 | 48 |
| 64 | 56 | 49 | 49 | 49 | 36 | 36 | 58 |

W75

(d) Cluster Label After Linking (e) After Clustering (a)　　　　　(b)　　　　　(c)

| | Conditions | Results | |
|---|---|---|---|
| | | Cluster Label D | Linked Cluster Labels |
| 1 | d=0 | O | |
| 2 | d≠0, a≠d, b≠d, c≠d | L | |
| 3 | d≠0, a≠d, b=d, c≠d, e≠d | L | |
| 4 | d≠0, a≠d, c=d | C | |
| 5 | d≠0, a≠d, b=d, c≠d, e=d | B | |
| 6 | d≠0, a=d, c≠d | A | |
| 7 | d≠0, a=d, c=d, A=C | A | |
| 8 | d≠0, a=d, c=d, A≠C | A | (A, C) |

(d)

Fig. 9
(a)
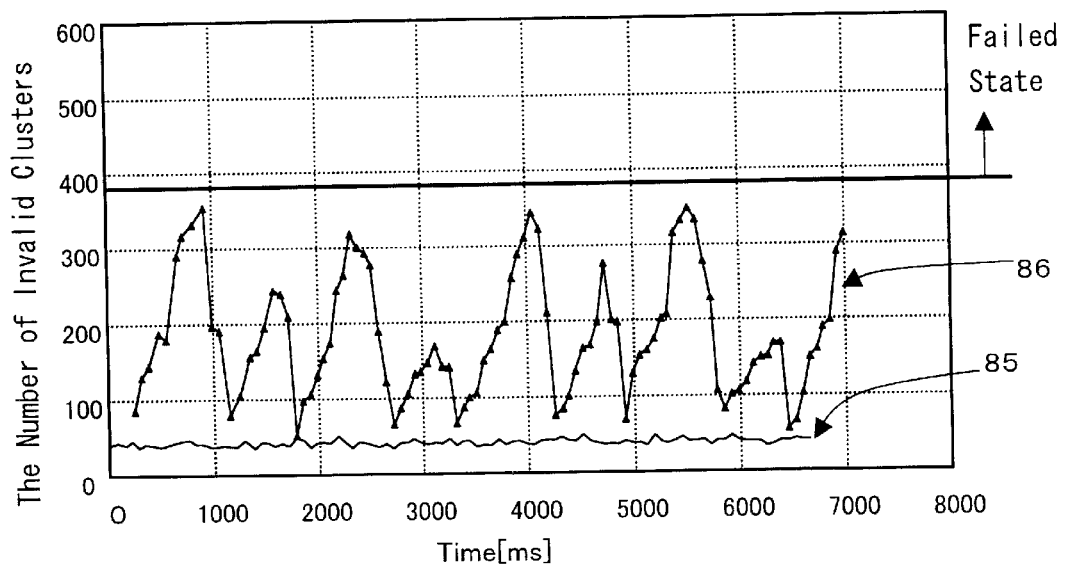
(b)
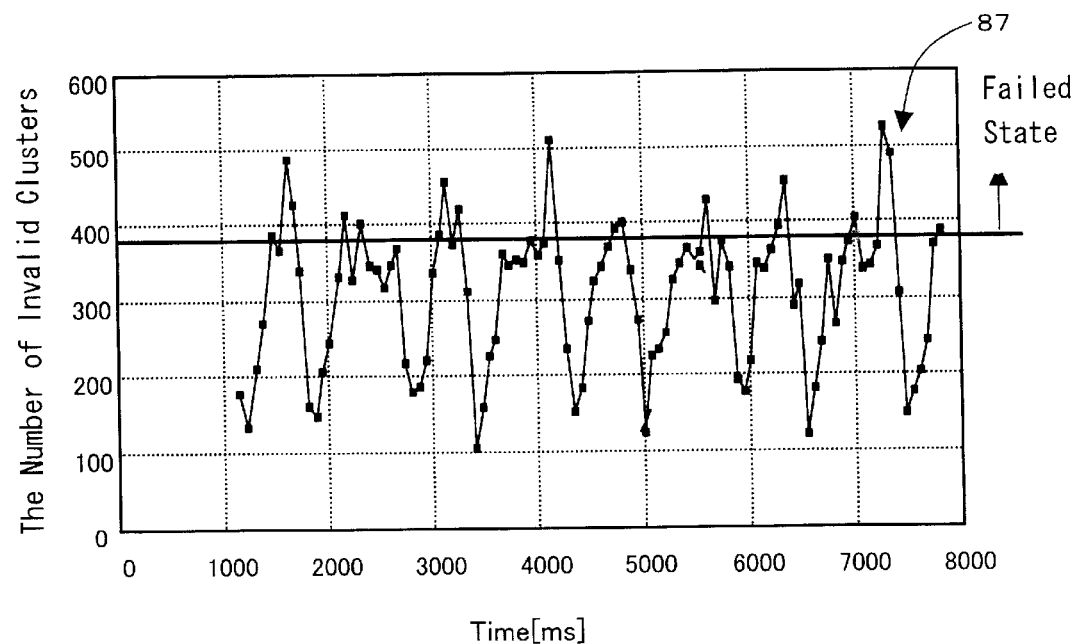

Fig. 11

| # of Combined Clusters | Combined Clusters | Inferred Object | Functional Value E1 |
|---|---|---|---|
| 1 | C22 | 75 | e01 |
| 2 | C23 | 75 | e02 |
| 3 | C24 | 75 | e03 |
| 4 | C25 | 75 | e04 |
| 5 | C26 | 75 | e05 |
| 6 | C22+C23 | 75 | e06 |
| 7 | C22+C24 | 75 | e07 |
| 8 | C22+C25 | 75 | e08 |
| 9 | C22+C26 | 75 | e09 |
| 10 | C23+C24 | 75 | e10 |
| 11 | C23+C25 | 75 | e11 |
| 12 | C23+C26 | 75 | e12 |
| 13 | C24+C25 | 75 | e13 |
| 14 | C24+C26 | 75 | e14 |
| 15 | C25+C26 | 75 | e15 |
| 16 | C22+C23+C24 | 75 | e16 |
| 17 | C22+C23+C25 | 75 | e17 |
| 18 | C22+C23+C26 | 75 | e18 |
| 19 | C22+C24+C25 | 75 | e19 |
| 20 | C22+C24+C26 | 75 | e20 |
| 21 | C22+C25+C26 | 75 | e21 |
| 22 | C23+C24+C25 | 75 | e22 |
| 23 | C23+C24+C26 | 75 | e23 |
| 24 | C23+C25+C26 | 75 | e24 |
| 25 | C24+C25+C26 | 75 | e25 |
| 26 | C22+C23+C24+C25 | 75 | e26 |
| 27 | C22+C23+C24+C26 | 75 | e27 |
| 28 | C22+C23+C25+C26 | 75 | e28 |
| 29 | C22+C24+C25+C26 | 75 | e29 |
| 30 | C23+C24+C25+C26 | 75 | e30 |
| 31 | C22+C23+C24+C25+C26 | 75 | e31 |

OBJECT RECOGNITION SYSTEM

FIELD OF THE INVENTION

The present invention relates to an optical object recognition system which detects objects in front of a vehicle such as an automobile, etc., by using an image capturing device having at least two cameras mounted on the vehicle. More specifically, the present invention concerns an object recognition system, which recognizes objects by using a plurality of windows in the captured images.

BACKGROUND OF THE INVENTION

In recent years, devices which determine the distance and size of objects in front of a vehicle, and which appropriately control the vehicle in accordance with this determination, have been proposed for the purpose of improving the safety of vehicle operation.

Laid-open Japanese Patent Application No. Hei 9-79821 describes one example of a system which employs an optical distance measuring device comprising two light-receiving elements to determine whether an object whose distance has been detected is a physical object or a road area (including characters or white lines on the road surface). The system calculates distances for respective calculation areas, and recognizes the areas in which obstructions are present by clustering calculation areas whose mutual distances are within a fixed range and are proximate to each other in the horizontal direction. In the case of this clustering, calculation areas whose distances have not been measured are also clustered.

Japanese unpublished Patent Application No. Hei 11-169567 assigned to the same assignee of the present invention, which was filed on Jun. 16, 1999, describes a system capable of recognizing objects quickly by assigning distance labels to individual windows according to the distance measured for the respective windows and clustering the windows based on the distance labels. The distance labels are predetermined for distance ranges, which in turn are predetermined according to errors in measured distances. Since windows are assigned with distance labels corresponding to the distance ranges to which the distances measured for the respective windows belong, the windows which represent the same object are clustered accurately, allowing the object in front of the vehicle to be recognized more accurately.

Object recognition systems such as the one described above, however, may recognize objects erroneously due to raindrops on the automobile windshield in front of the imaging cameras or due to noise in images. In dealing with this situation, attempts to detect raindrops using technologies for recognizing the outside environment in bad weather by means of visible light cameras, infrared cameras, rain sensors, or other external sensors, as disclosed by Laid-open Japanese Patent Application No. 2000-19259, will incur high costs.

On the other hand, checking the validity of recognizing objects from captured images separately from the object recognition itself in order to prevent raindrops or noise from causing objects to be recognized erroneously will require additional processing time and memory capacity.

Thus, an object of the present invention is to provide an object recognition system which judges the validity of captured images based on the distances measured for windows instead of using separate sensors and which is free from erroneous recognition caused by raindrops or noise.

Another object of the present invention is to provide an object recognition system which can judge the validity of object recognition during the process of object recognition, reducing the requirements for processing time and memory capacity.

SUMMARY OF THE INVENTION

According to one aspect of the invention, an object recognition system having at least two image sensors and a controller that is adapted for measuring the distance from the system to a physical object with respect to respective windows of an image captured by the sensors is provided. The controller is programmed to form clusters by uniting adjacent windows that have similar measured distances, to judge whether each of the clusters is valid or invalid based on the attributes of the cluster. The controller is further programmed to recognize the physical object based on the clusters judged to be valid.

According to one aspect of the invention, the attributes of the cluster include an area of the cluster. The controller is programmed to calculate the area of the cluster based on the number of windows contained in the cluster and measured distance of each of the windows. The controller is programmed to judge that the cluster is valid if the area is larger than a predetermined threshold value.

According to another aspect of the invention, the attributes of the cluster include the number of windows contained in the cluster. The controller is programmed to judge that the cluster is valid if the number of windows contained in the cluster is larger than a threshold value that is predetermined according to the measured distances of the windows contained in the cluster.

According to one aspect of the invention, the controller is further programmed to detect any failed state of the captured image based on the number of clusters judged to be invalid.

According to another aspect of the invention, the controller is further to programmed to detect any failed state of the captured image based on the ratio of the number of clusters judged to be invalid to the total number of clusters contained in the captured image.

The process of recognizing the object or the control of the vehicle mounting the system based on the recognized object may be disabled if said controller judges that the captured image is in the failed state.

According to another aspect of the invention, a method for recognizing a physical object in front of a vehicle is provided. The method comprises capturing an image in front of the vehicle, measuring distance from the vehicle to a physical object with respect to respective windows of the captured image, uniting adjacent windows that have similar measured distances to form clusters, judging whether each of the clusters is valid or invalid based on the attributes of the cluster, and recognizing the physical object based on the clusters judged to be valid.

The attributes of the cluster include an area of the cluster. The step of judging includes calculating the area of the cluster based on the number of windows contained in the cluster and measured distance of each of the windows, and judging that the cluster is valid if the area is larger than a predetermined threshold value.

According to another aspect of the invention, the attributes of the cluster include the number of windows contained in the cluster. The step of judging includes judging that the cluster is valid if the number of windows contained in the cluster is larger than a threshold value that is predetermined according to the measured distances of the windows contained in the cluster.

According to another aspect of the invention, the method for recognizing a physical object further comprises detecting any failed state of the captured image based on the number of clusters judged to be invalid.

According to another aspect of the invention, the method for recognizing a physical object further comprises detecting any failed state of the captured image based on the ratio of the number of clusters judged to be invalid to the total number of clusters contained in the captured image.

The step of recognizing or the control of the vehicle based on the recognized object may be disabled if it is judged that the captured image is in the failed state.

The controller can comprise a micro-controller which typically includes a central unit (CPU), or a micro-processor, a read-only memory (ROM) containing control programs that when executed by the processor performs respective functions which are to be described hereafter. The controller also includes a random-access memory (RAM) that provides a working area for the CPU and temporary storage for various data and programs.

BRIEF DESCRIPTION OF THE DRAWINGS

FIGS. 3(a) is a diagram showing the image that is captured, and FIG. 3(b) shows the image divided into small areas (windows) for the purpose of judging distances and road areas, in accordance with one embodiment of the present invention.

FIG. 5 is a table showing the division of distances taking errors of the measured distances into account, in one embodiment of the present invention.

FIG. 6 is a diagram illustrating a clustering scheme in accordance with one embodiment of the present invention.

FIG. 9 is a diagram showing changes in the number of invalid clusters depending on rainfall in one embodiment of the present invention.

FIGS. 10(a) to 10(c) are diagrams illustrating a method of recognizing objects in the previous cycle in one embodiment of the present invention, wherein FIG. 10(a) shows a captured image, FIG. 10(b) shows clusters based on the captured image, and FIG. 10(c) shows recognized physical objects.

FIGS. 10(d) to 10(f) are diagrams illustrating a method of recognizing objects in the current cycle in one embodiment of the present invention, wherein FIG. 10(d) shows a captured image, FIG. 10(e) shows clusters based on the captured image, and FIG. 10(f) shows recognized physical objects.

FIG. 11 is a table showing combinations of clusters in one embodiment of the present invention.

DESCRIPTION OF THE PREFERRED EMBODIMENTS

Introduction

Figure 1:
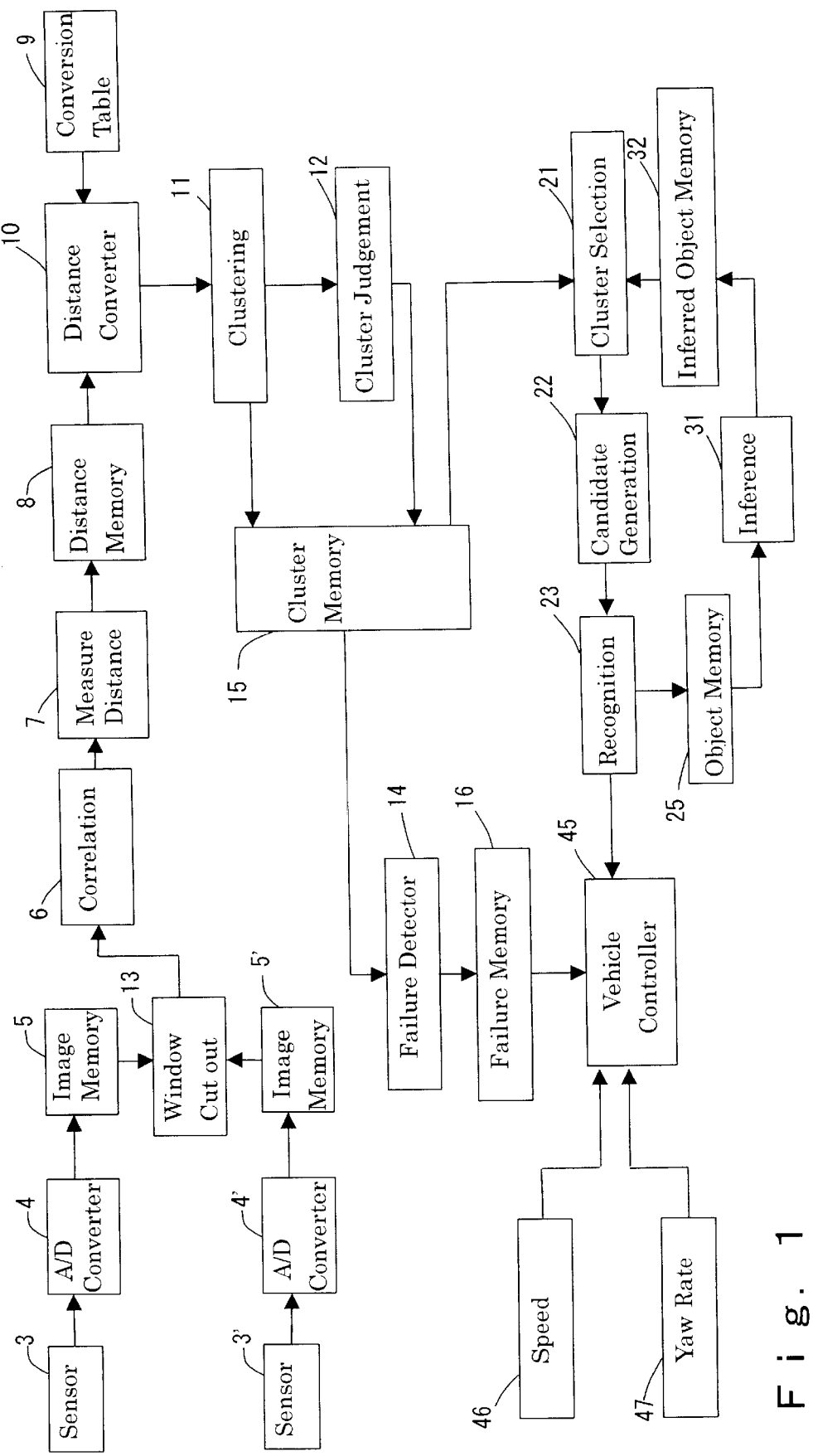
FIG. 1 is a block diagram illustrating the overall structure, and functional blocks of the controller of one embodiment of the present invention.

The invention will now be described relative to preferred embodiments referring to attached drawings. FIG. 1 is an overall block diagram of an object recognition system in accordance with one embodiment of the present invention. Other than the sensors 3 and 3', all the blocks in FIG. 1 can be incorporated in a controller which comprises a single chip or multiple chip semiconductor integrated circuit. Thus, FIG. 1 shows functional blocks of the controller. Respective functions of the blocks are preformed by executing respective programs stored in the ROM of the controller.

A method of recognizing objects according to one embodiment comprises calculating measured distances, converting the measured distances into distance labels, clustering windows, judging the validity of each of the clusters, detecting a failed state, and recognizing objects.

In the process of calculating measured distances, a window cut-out part 13 cuts out windows from the image captured by image sensors 3 and 3' and stored in image memories 5 and 5', and then a correlation calculating part 6 and distance calculating part 7 calculate measured distances for individual windows. In the process of converting the measured distances into distance labels, a distance converter 10 assigns distance labels to the windows according to the measured distances calculated for respective windows. In the process of clustering windows, a clustering part 11 clusters the windows according to the assigned distance labels, to form clusters.

In the process of judging the validity of each of the clusters, a cluster judging part 12 judges whether each of the formed clusters are valid or invalid according to its attributes. In the process of detecting a failed state, a failure detector 14 detects any failed state of the captured images based on the clusters judged invalid. In the process of recognizing objects, a cluster selection part 21, candidate generating part 22, physical object recognition part 23, and physical object inferring part 31 run an object recognition sequence using information on the objects recognized in the past.

A vehicle controller 45 controls the vehicle, based on the results of the object recognition sequence. If a failed state is detected by the failure detector 14, the vehicle controller 45 invalidates the results of the object recognition sequence and disables the vehicle control which is based on these results. Each of the processes will be described in detail below with reference to the drawings.

Calculation of Measured Distance

Figure 2:
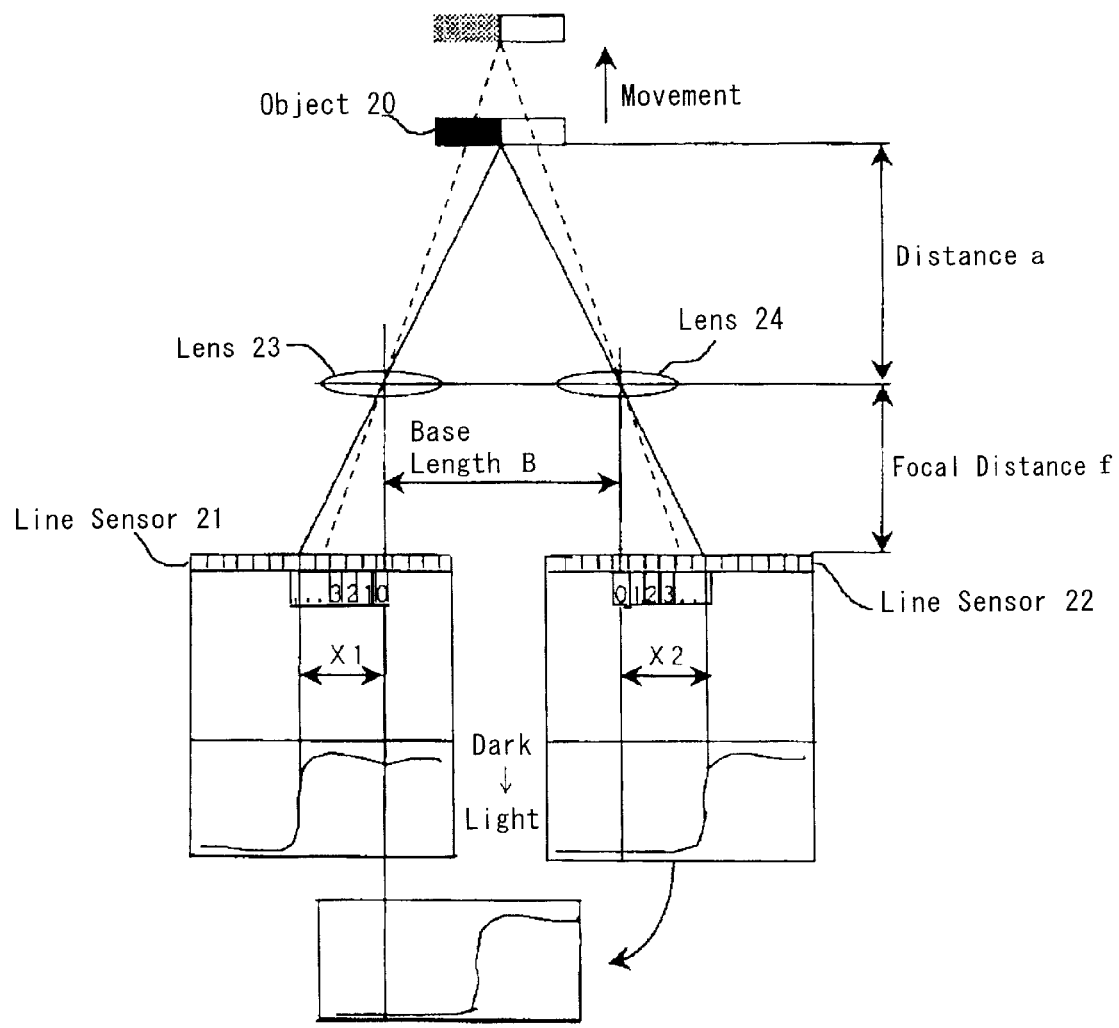
FIG. 2 is a diagram illustrating a principle of measurement by the triangulation method.

FIG. 2 is a diagram which indicates the distance measurement principle based on the triangulation method used in the present embodiment. First, a distance measurement method using a pair of image sensors will be described with reference to FIG. 2. A line sensor 21 and lens 23 constituting one of the above-mentioned pair of image sensors are installed at a specified distance, i. e., at a distance equal to the base line length B in the horizontal or vertical direction from the line sensor 22 and lens 24 constituting the other image sensor of the other of the pair. The line sensors 21 and 22 are typically one-dimensional CCDs, but may also be linearly arranged photo-sensor arrays. Considering use at night, image sensors using infrared light are preferable In this case, it is preferable to install infrared-transparent filters in front of the lenses 23 and 24, and to construct the system so that an object 20 is illuminated at predetermined time intervals using an infrared light source. Infrared light reflected from the object 20 is sensed by the line sensors 21 and 22.

The line sensors 21 and 22 are respectively positioned at the focal lengths "f" of the lenses 23 and 24. Assuming that an image of an object located at distance "a" from the plane of the lenses 23 and 24 is formed at a position shifted by a distance X1 from the optical axis of the lens 23 in the case of the line sensor 21, and is formed at a position shifted by a distance X2 from the optical axis of the lens 24 in the case of the line sensor 22, then, according to the principle of triangulation, the distance "a" to the object 20 from the plane of the lenses 23 and 24 is determined by the equation:

$$a = B \cdot f / (X1 + X2).$$

In the present embodiment, the images are digitized. And accordingly, the distance (X1+X2) is digitally calculated. The sum of the absolute values of the differences between the digital values indicating the brightness of the corresponding pixels of both images obtained from the line sensors 21 and 22 is determined while one or both of said images are shifted, and this sum is taken as a correlation value. The amount of shift of the images when this correlation value is at a minimum indicates the positional deviation between the two images, i. e., (X1+X2). In idealized terms, the distance by which the two images obtained from the line sensors 21 and 22 must be moved in order to cause said images to overlap as shown in FIG. 2 is (X1+X2).

Here, for the sake of simplicity, the image sensors have been described as one-dimensional line sensors 21 and 22. However, in one embodiment of the present invention, as will be described below, two-dimensional CCDs or two-dimensional photo-sensor arrays are used as image sensors. In this case, the same correlation calculations as those described above are performed by relatively shifting the two-dimensional images obtained from the two image sensors. The amount of shift at the point where the correlation value reaches a minimum corresponds to (X1+X2).

The image sensor 3 shown in FIG. 1 corresponds to one of the image sensor in FIG. 2, consisting of the lens 23 and line sensor 21, and the image sensor 3' corresponds to the other image sensor in FIG. 2, consisting of the lens 24 and line sensor 22. In this embodiment, as is shown in FIG. 3 (*b*), the imaged area is divided into a plurality of windows (small sections) $W_{11}$, $W_{12}$, . . . and distance is measured for each window. Accordingly, a two-dimensional image of the overall object is required. Accordingly, each of the image sensor 3 and 3' is comprised of a two-dimensional CCD array or a two-dimensional photo-sensor array.

FIG. 3 (*a*) shows an example of the image obtained when another vehicle running in front of the vehicle incorporating the system of the present invention is imaged by one of the image sensor 3 or 3'. FIG. 3 (*b*) shows the image in FIG. 3(*a*) schematically split into a plurality of small sections called windows. FIG. 3(*b*) has rows in the vertical direction and columns in horizontal direction. For the sake of simplicity, the image is shown splitting into 10 rows×15 columns of windows. Reference numerals are assigned to the respective windows. For example $W_{12}$ indicates the window in row 1, column 2.

Referring to FIG. 1, the images of objects captured by the image sensor 3 and 3' are converted into digital data by analog-digital converters (A/D converters) 4 and 4' and stored in image memories 5 and 5'. The image portions corresponding to the window $W_{11}$ are respectively cut out from the image memories 5 and 5' by a window cutout part 9 and sent to a correlation calculating part 6. The correlation calculating part 6 shifts the two cutout images by a specified unit at a time, and performs the aforementioned correlation calculations. The amount of shift at the point where the correlation value reaches a minimum corresponds to (X1+X2). The correlation calculating part 6 sends the value of (X1+X2) thus determined to a distance calculating part 7.

The distance calculating part 7 determines the distance $a_{11}$ to the object in the window $W_{11}$ using the aforementioned formula: $a = B \cdot f / (X1+X2)$. The distance $a_{11}$ thus determined is stored in a distance memory 8. A similar calculation process is successively performed for respective windows, and the resulting distances $a_{11}$, $a_{12}$, . . . are stored in the distance memory 8. The distance to a captured object calculated for each window is referred to as the measured distance of the window.

In the image data used in the above mentioned correlation calculations, the pitch of the elements in the imaging element array determines the resolution. Accordingly, when a light-receiving element such as a photo-sensor array that has a relatively large pitch is used, it is preferred to enhance the density of the image data by performing calculations involving inter-pitch interpolation. Correlation calculations can be performed for image data whose density has thus been enhanced.

Furthermore, in order to correct for variations in the characteristics of the imaging element array according to temperature, a temperature sensor may be installed in the vicinity of the imaging element array, and the distance calculations are corrected based on temperature information obtained from the temperature sensor.

In one embodiment of the present invention, among the measured distances calculated for the windows, the measured distances judged as road surface distances may be excluded. The road surface distance is the distance from the image sensors to the road surface when the vehicle is parallel to the road surface. This distance can be determined beforehand based on the attachment positions, installation angles, base line length, focal lengths and size of the image sensor 3 and 3' (realized by means of CCD arrays) and the positions of the windows in the image, and are stored in a memory. If the measured distance is close to or larger than the road surface distance, it is judged that the object represented by the window is a road surface and not an object on the road. Then the measured distances of windows judged to belong to the road surface may be deleted from the distance memory 8.

Conversion of Measured Distances to Distance Labels

Referring to FIG. 1, the distance converter 10 assigns windows distance labels associated with the distance ranges to which measured distances of the respective windows belong. Distance ranges and associated distance labels are preset and stored in a distance conversion table 9.

Figure 4:
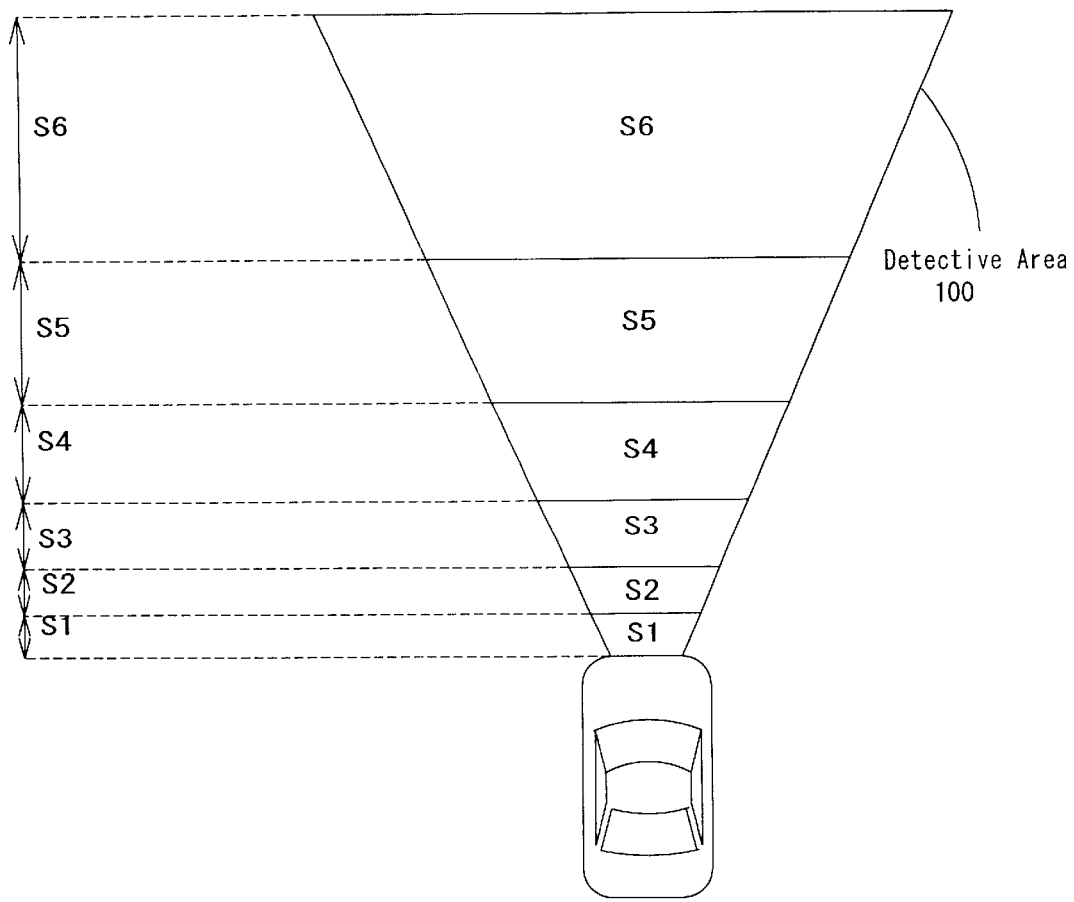
FIGS. 4(a) is a diagram showing the division of a detection area.
FIG. 4(b) shows the setting of distance ranges and distance levels, in one embodiment of the present invention.

A method of setting distance ranges will be described referring to FIG. 4. One example of a detection area 100 is shown in FIG. 4(*a*) . The detection area 100 is an area in which distances can be measured by the image sensors 3 and 3'. The area 100 is determined based on the specification and positions of the image sensors 3 and 3'. For example, the detection area 100 can be set with a distance range of 60 meters and an angular range of 30 degrees. The detection area 100 can be fixed beforehand.

Alternatively, the detection area 100 may dynamically be set in accordance with the speed of the vehicle. In this case, the detection area 100 is set so that the distance range increases and the angular range decreases with an increase in the speed of the vehicle.

The detection area 100 is divided into a plurality of distance ranges so that there is no overlapping. In this embodiment, the precision of the measured distances drops as the distance from the vehicle mounting the image sensor 3 and 3' increases. Accordingly, the detection area 100 is divided so that it has wider distance ranges as the distance from the vehicle increases, as shown by S1 through S6 in FIG. 4.

The distance ranges are set in accordance with the tolerance in the measured distances. Here, the value of the distance tolerance depends on the specifications, etc., of the image sensor 3 and 3'. In the present embodiment, because a precision of 10% tolerance may not be insured for all the pixels, the distance ranges are set with the distance tolerance of 30% for high speed processing. Accordingly, the distance range for a certain given distance is set as "distance~(distance×(1+0.3))".

A method of assigning distance labels to distance ranges will be described referring to FIG. 5. FIG. 5 is a table showing the relationship between distances and the distance labels where the tolerance is set at 30%. The unit of distance is 0.1 m. Different distance labels are provided to different distance ranges. For example, in the case of a distance of "1", 30% of the distance is 0 (values below the decimal point are discarded). Accordingly, the distance label of "1" is assigned to the distance of "1". In the case of a distance of "2", because 30% of the distance is 0, the label of "2" is assigned to the distance of "2". Here, the distance label increments by 1 each time the distance range changes. In the case of a distance of "20", 30% of the distance is "6". Accordingly, a distance label of "9" is assigned to the distance range of "20" through "26". In this way, the distance ranges are progressively set from short distances to long distances, so that each of distance labels is assigned to each of distance ranges. Other distinguishable symbols such as letters of the alphabet, etc., may also be used as the distance labels.

In the present embodiment, for the sake of simplicity, several distance ranges shown in FIG. 5 are combined to form larger distance ranges, so that the distance ranges S1 through S6 are set as shown in FIG. 4(*b*), and new distance labels 1 through 6 are respectively assigned to these distance ranges. FIG. 4 (*a*) shows the distance ranges S1 through S6 of FIG. 4(*b*).

When the detection area is fixed beforehand, the distance ranges to which distance labels have thus been assigned are stored as a distance conversion table 9. On the other hand, when the detection area is dynamically updated, the stored distance conversion table can be dynamically updated.

The distance converter 10 in FIG. 1 converts the measured distance of each window into a corresponding distance label, based on the distance conversion table 9. As to windows for which measured distances are not available due to, for example, lack of contrast, a label not used in the distance conversion table 9—for example "0"—is assigned.

Referring to FIG. 6 as an example, FIG. 6(*a*) shows the measured distances of the windows in a captured image while FIG. 6(*b*) shows the distance labels assigned to the windows, based on the distance conversion table 9 as shown in FIG. 4(*b*).

Clustering of Windows

Figure 7:
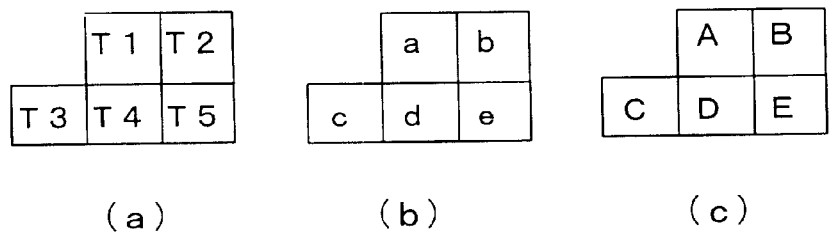
FIG. 7 is a diagram illustrating a template and a method of determining cluster labels used in one embodiment of the present invention.

The clustering part 11 assigns cluster labels to the respective windows based on the distance labels, and windows that have the same cluster labels are formed into an integral cluster. Clustering can be performed using a known method. In the present embodiment, a clustering process using a template as shown in FIG. 7 is used. The clustering process is described in detail in U.S. patent application Ser. No. 09/572,249, which is incorporated herein by reference.

The clustering part 11 assigns cluster labels to the windows using the template shown in FIG. 7. T1 through T5 in FIG. 7(*a*) indicate positions in the template. "a" through "e" in FIG. 7(*b*) indicate the distance labels of windows respectively corresponding to the positions T1 through T5 when the template is positioned so that T4 assumes the place of a window to be processed. "A" through "E" in FIG. 7(*c*) indicate the cluster labels assigned to windows respectively corresponding to the positions T1 through T5.

The table in FIG. 7(*d*) shows the type of cluster label D that is assigned to the window at position T4 based on the distance labels for the windows at positions T1 through T5 when T4 is placed at the window to be processed. For example, if the distance labels "a" through "e" at positions T1 through T5 satisfy condition 5 in FIG. 7(*d*), then a cluster label B is assigned to the window at T4. The cluster label "L" is assigned when conditions 2 or 3 is satisfied requiring a new cluster label.

Taking FIG. 6(*b*) as an example, a clustering method, which employs the template shown in FIG. 7, will be described below. The clustering part 11 scans the windows in a frame of the image from the upper left corner to the lower right corner placing T4 of the template at respective windows on the image frame. In this example, the cluster label is expressed by two digits. The higher digit represents the distance label and the lower digit is incremented by one each time condition 2 or 3 in the table of FIG. 7(*d*) is satisfied. Alternatively, any symbols such as numerals or alphabetic characters may also be used as cluster labels. When T4 in the template is placed at the edge of the image, one or more positions T1, T2, T3 and T5 do not have corresponding windows in the image frame, The distance labels of the windows corresponding to such one or more positions are assumed to be different from the distance label of the window corresponding to T4 in the template.

First, T4 in the template is positioned on the window W11. The distance label of the window W11 is "3." Positions T1, T2 and T3 do not have corresponding windows. It is assumed that d≠a, that d≠b, and that d≠c. Thus, condition 2 in FIG. 7(*d*) is satisfied and a cluster label 31 is assigned to the window W11. Next, T4 in the template is positioned on the window W12. Since the window W12 satisfies condition 4 in FIG. 7(*d*), it is assigned the same cluster label "31" as the window W11. Then, T4 in the template is positioned on the window W13. Since the window W13 satisfies condition 2 in FIG. 7(*d*), it is assigned a new cluster label "41." The window W14, which also satisfies condition 2 in FIG. 7(*d*), is assigned a new cluster label "51." The window W15 also satisfies condition 2 in FIG. 7(*d*) and is assigned a new cluster label "42." When W11 to W18 have been assigned cluster labels in this way, W21 to W28, W31 to W38, . . . W81 to W88 are assigned cluster labels in sequence. FIG. 6(*c*) shows the cluster labels thus assigned to windows.

When condition 8 in FIG. 7(*d*) is satisfied, the clustering part 11 links the cluster labels at T1 and T3 of the template, and stores these linked cluster labels in a cluster memory 15. Linkage will be described below with reference to FIG. 6(*c*) and (*d*).

Since condition 2 in FIG. 7(*d*) is satisfied when T4 in the template is positioned on the window W75 in FIG. 6(*c*), a new cluster label "47" is assigned to it. Then, cluster labels are assigned to the windows W76 to W78 and W81 to W84. Since condition 8 in FIG. 7(*d*) is satisfied when T4 in the template is positioned on the window W85, a cluster label "47" which is the same as that of the window W75 is assigned. As a result, the cluster label of the window W84 is different from the cluster label of the window W85, despite that the windows are adjacent to each other and have the same distance label "4."

When condition 8 in FIG. 7(d) is satisfied, the cluster labels corresponding to A and C of the template are linked. The cluster labels "47" and "49" of the windows W84 and W75 in this example are linked and stored in the cluster memory 15 as an integral cluster. After cluster labels have been assigned to all of the windows, the same cluster label replaces the two cluster labels stored in linked form. For example, the cluster label "47" may be replaced with "49" as shown in FIG. 6(d), or vice-versa. Alternatively, "47" and "49" may be replaced with a new cluster label.

In this way, adjacent windows with the same distance label are assigned the same cluster label, forming an integral cluster. The clusters thus determined are shown in FIG. 6(e). By using distance labels instead of handling the measured distance values themselves, clustering of windows can be carried out at high speed.

The template shown in FIG. 7 is an example, other templates can also be used to scan windows. The order of scanning should preferably be determined according to the type of template.

Judgment of Clusters' Validity

Returning to FIG. 1, the cluster judging part 12 judges the validity of each of clusters obtained by the clustering part 11 based on its attributes. As a cluster attribute, this embodiment uses an area of a cluster or the number of windows forming a cluster. However, it is also possible to judge the validity of each of clusters by using another attribute such as the locations of the windows forming a cluster.

First, a method of determining the area A (m²) of a cluster will be described with reference to FIG. 8. FIG. 8(a) is a diagram for calculating the horizontal length Xp (i.e., the width) of an object 80 imaged on a window Wp. $\mu_h$ (m) denotes the horizontal length of the window Wp, f (m) denotes the focal length of a lens 81, and Dp (m) denotes the measured distance of the window Wp determined by the distance calculating part 7 as described above. These parameters are expressed in Equation (1):

$$Xp = \mu_h \cdot Dp/f \qquad (1)$$

Figure 8:
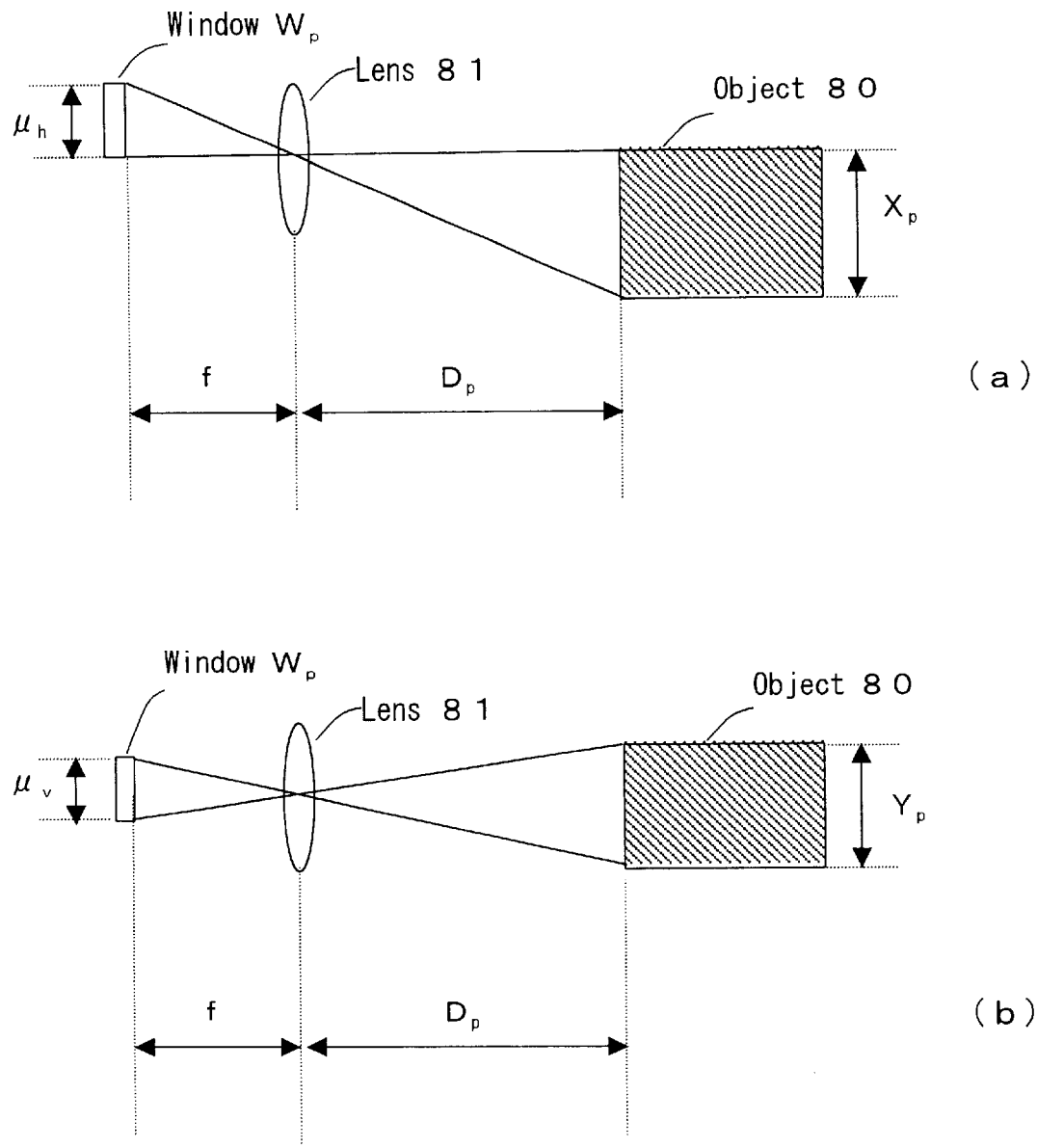
FIGS. 8(a) and 8(b) are diagrams illustrating a method of determining the horizontal length and vertical length of an object captured in one embodiment of the present invention.

FIG. 8(b) is a diagram for calculating the vertical length Yp (i.e., the height) of the object 80 imaged on the same window Wp as in FIG. 8 (a). $\mu_v$ (m) denotes the vertical length of the window Wp. These parameters are expressed in Equation (2):

$$Yp = \mu_v \cdot Dp/f \qquad (2)$$

Since the horizontal and vertical lengths $\mu_h$ and $\mu_v$ of the window are constant, the area A (m²) of the cluster is given by Equation (3):

$$A = \sum_p X_p \cdot Y_p = \frac{\mu_h \mu_v}{f^2} \sum_p (D_p^2) \qquad (3)$$

On the other hand, as expressed by Equation (4) below, the average $D_{ave}$ of the measured distances of windows can be obtained by dividing the sum of the measured distances Dp by the number N of the windows forming the cluster. By using the average $D_{ave}$ of the measured distances, Equation (3) can be approximated by Equation (5).

$$D_{ave} = \frac{\sum_p D_p}{N} \qquad (4)$$

$$A = \frac{\mu_h \mu_v}{f^2} D_{ave}^2 N \qquad (5)$$

The area A of the cluster is determined in this way. The cluster judging part 12 judges that the cluster is valid if its area A is larger than a predetermined threshold value (for example, 100 cm²) and judges that the cluster is invalid if its area A is smaller than the predetermined threshold value. Thus, small clusters formed by noise or raindrops are judged invalid. Accordingly, it is possible to avoid erroneous object recognition caused by noise or raindrop clusters.

The threshold value is determined depending on what size clusters should be excluded as noise components and what size clusters should be recognized as an object. However, when contrast during capturing an image is low, a large number of smaller clusters may be generated. Therefore, if too large a threshold value is specified, no cluster may be judged valid even though there actually exists an object. For example, if the threshold value is adapted to the size of a vehicle ahead (e.g., 2 square meters), then no cluster may reach the threshold value, resulting in the inability to recognize a vehicle ahead as an object. Therefore, it is preferable to set the threshold value to the size (e.g., 1 square meter) which can be distinguished from noise components and which should be recognized as an object.

According to an alternative embodiment, the cluster judging part 12 judges the validity of each of clusters, based on the number $N_o$ of windows corresponding to the threshold value $A_o$. Based on Equation (5), the number $N_o$ of windows corresponding to the threshold value $A_o$ is predetermined for each measured distance D of the cluster (Equation (6)).

$$N_0 = \frac{f^2}{\mu_h \mu_v D^2} A_0 \qquad (6)$$

The cluster judging part 12 compares the number N of windows forming the cluster with $N_o$. It judges that the cluster is invalid if $N < N_o$ and it judges that the cluster is valid if $N \geq N_o$. The average $D_{ave}$ of the measured distances of the windows forming the cluster, as determined by Equation (4), may be used as the measured distance D of the cluster.

The cluster judging part 12 stores the clusters judged to be valid and the number of the valid clusters in the cluster memory 15. The cluster judging part 12 also stores the clusters judged to be invalid and the number of the invalid clusters in the cluster memory 15. Moreover, the cluster judging part 12 stores, the areas of clusters (i.e., the height and width of the object represented by the clusters), distances of the clusters, and horizontal and vertical positions of the clusters in the cluster memory 15. The horizontal and vertical positions of the clusters can be determined from the heights and widths of the clusters and the locations, on the image, of the windows forming the clusters. They can be expressed, for example, in a coordinate system with the origin at the vehicle mounting the present object recognition system.

Detection of Failed State

Based on the number or ratio of the clusters judged invalid by the cluster judging part 12, the failure detector 14 judges whether object recognition can be performed properly. The state in which object recognition cannot be performed properly is referred to as a failed state.

Since a cluster is a group of windows with actually the same measured distance, if a captured image contain many regions with small variations in distance, a lot of clusters with small areas will be formed. This is of ten because measured distances contain errors as a result of correlation calculations performed on low-contrast regions or an image containing noise. Therefore, in order to avoid erroneous recognition of objects, it is necessary to disable object recognition based on clusters formed under such conditions. Thus, the failure detector 14 detects a failed state using the number or ratio of the invalid clusters as an index of the amount of noise.

FIG. 9 is a diagram showing fluctuation of the number of invalid clusters due to rainfall. The horizontal axis represents elapsed time while the vertical axis represents the number of invalid clusters detected by the cluster judging part 12. In FIG. 9(a), graph 85 shows changes in the number of invalid clusters measured on a clear day while graph 86 shows changes in the number of invalid clusters measured under a light rain. Graph 87 in FIG. 9(b) shows changes in the number of invalid clusters measured under a heavy rain.

As shown in graph 85, there are few invalid clusters on a clear day because no raindrop clings to the windshield in front of the imaging sensors 3 and 3' and little noise is produced. Under a light rain, as shown in graph 86, more invalid clusters are detected than on a clear day because raindrops cling to the windshield and are captured by the imaging sensors. Under a heavy rain, as shown in graph 87, much more invalid clusters are detected than under a light rain because much more raindrops cling to the windshield.

In graphs 86 and 87 under a light rain and heavy rain, respectively, the periodic changes in the number of invalid clusters are caused by the motion of the wipers. Since raindrops are wiped off the windshield by the wipers, the number of invalid clusters decreases locally just after a swing of the wipers.

The failure detector 14 judges a failed state if the number of invalid clusters exceeds a predetermined value (380 in the example of FIG. 9). As can be seen from graph 87 in FIG. 9, a failed state is judged periodically under a heavy rain unlike in a clear day or a light rain. Alternatively, it is also possible to judge a failed state when the ratio of invalid clusters to the total number of clusters in the image exceeds a predetermined value (e.g., 80%).

If the failure detector 14 judges a failed state, a failed status flag is set on the image captured in the current cycle and stores the image with the flag in a failure memory 16.

Object Recognition

Returning to FIG. 1, a cluster selection part 21, candidate generating part 22, physical object recognition part 23, and physical object inference part 31 run a sequence of operations to recognize an object in front of the vehicle mounting the present system, based on the clusters judged valid by the cluster judging part 12. There are many object recognition methods using clusters, and any of them can be used. In this embodiment, a method of inferring the position of the objects in the current cycle using information on the objects recognized in the previous cycle and recognizing the objects based on the object inferred and clusters judged valid is used. This object recognition process is described in detail in U.S. patent application Ser. No. 09/572,249, which is incorporated herein by reference.

An object memory 25 stores the attributes of the objects recognized in the previous cycle by the physical object recognition part 23 (e.g., information on the positions including distances and horizontal and vertical positions, and sizes including widths and heights of the objects, etc.) as well as relative speeds with respect to the objects. Based on these parameters, the physical object inferring part 31 infers the position of the objects in the image captured in the current cycle. The processing by the physical object inferring part 31 should preferably be carried out concurrently with the clustering process described above.

Figure 10:
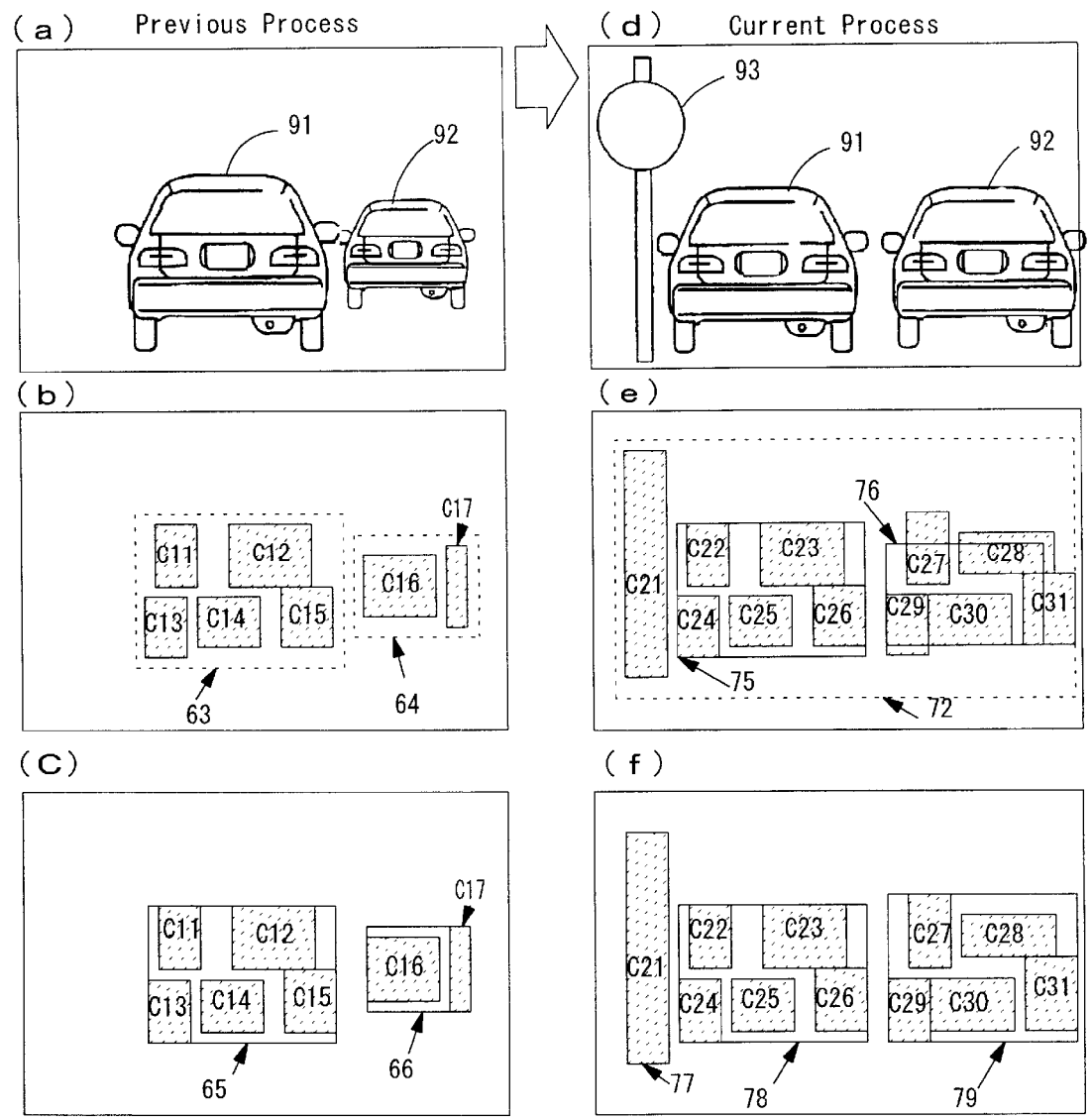

Referring to FIG. 10, a method of inferring objects performed by the inference part 31 will be described below. FIGS. 10(a) through 10(c) show a previous processing. In FIG. 10(a), two vehicles 91 and 92 are captured in the previous cycle. FIG. 10(b) shows clusters C11 through C17 determined by the clustering part 11 based on the captured image shown in FIG. 10(a). FIG. 10(c) shows physical objects 65 and 66 recognized from the clusters, which correspond to the vehicle 91 and vehicle 92 respectively.

FIGS. 10(d) through 10(f) show the current processing. In FIG. 10(d), the same vehicles 91 and 92 as those in FIG. 10(a) are captured. Additionally, a sign 93 is captured. FIG. 10(e) shows clusters C21 through C31 determined by the clustering part 11 based on the captured image shown in FIG. 10(d). FIG. 10(f) shows physical objects 77, 78 and 79 recognized in the current cycle based on the clusters shown in FIG. 10(e) and the physical objects 65 and 66 shown in FIG. 10(c).

The physical object inference part 31 reads out the positions and relative speeds of the previously recognized physical objects 65 and 66 from the physical object memory 25, and calculates the current positions of the physical objects 65 and 66. This calculation can be performed using the calculation formula:

(position of previous physical object+relative speed×detection time interval).

In this example, the relative speed with respect to the physical object 65 is assumed to be zero, the relative speed with respect to the physical object 66 is assumed to be −10 kilometers per hour (in this example, when the speed of the vehicle mounting the system is greater than the speed of a physical object the relative speed is expressed as "minus"), and the detection time interval is assumed to be 100 milliseconds. The relative distance to the physical object 65 is estimated to be unchanged between the previous cycle and the current cycle, and the relative distance to the physical object 66 is estimated to be shortened by 0.3 meters.

Assuming that the relative horizontal positions of the objects 65 and 66 with respect to the vehicle mounting the system are unchanged, since the size of the objects 65 and 66 is unchanged, the inference part 31 can infer the current positions of the objects 65 and 66 based on the changes in the relative distance. FIG. 10(e) shows objects 75 and 76 inferred in this fashion, by rectangular regions on the image. The inference part 31 stores the attributes (i.e., information concerning the objects such as distances, horizontal positions, vertical positions, widths and heights, etc.) of the inferred objects 75 and 76 in an inferred object memory 32.

In the current cycle, the cluster selection part 21 reads the distances and horizontal and vertical positions of the clusters C21 to C31 formed as shown in FIG. 10(e) out of the cluster memory 15. On the other hand, the cluster selection part 21 reads the distances and horizontal and vertical positions of the inferred objects 75 out of the inferred object memory 32. In this embodiment, the inferred objects are handled starting from the one closest to the vehicle mounting the system. Among the clusters C21 to C31, the cluster selection part 21 selects the clusters whose difference in distance from the inferred object 75 is less than a threshold value and that overlap with the inferred object 75 at least partially in the horizontal and vertical positions. As a result, the clusters C22 to C26 are selected.

Preferably, the threshold value of the difference in distance is determined in accordance with the tolerance of the distance from the vehicle mounting the system. In other words, the threshold value is determined in proportion to the distance from the vehicle.

If a cluster overlaps partly with the inferred object in the horizontal and vertical directions, it is judged there is overlapping. It is not necessary that an entire cluster is included in the inferred object.

In the case where a cluster does not satisfy the above distance condition for any of the inferred objects stored in the memory 32, or in the case where a cluster has no overlapping with all the inferred objects stored in the memory 32, the cluster is judged as having no corresponding inferred object.

The candidate generating part 22 studies all possible combinations of the clusters selected by the cluster selection part 21, and determines combined clusters as candidates for a physical object. The combination may include a combination comprising a single cluster. FIG. 11 is a table showing all possible combinations of the clusters C22 through C26 selected for the inferred object 75 shown in FIG. 10(e).

The physical object recognition part 23 successively compares the attributes of combined clusters which have corresponding inferred physical objects with the attributes of the inferred physical objects. The recognition part 23 recognizes the combined clusters that have attributes closest to the attributes of the inferred physical objects as physical objects. Here, the attributes used are distance, horizontal position, vertical position, width and height, and the comparison of attributes is accomplished using the following Equation (7). The meanings of the variables in Equation (7) are shown in Table 1.

TABLE 1

[Equation 7]
$$E1 = \sqrt{(Xc - Xt)^2 + (Yc - Yt)^2 + (Zc - Zt)^2 / C \cdot Zt} + |Wc - Wt| + |Hc - Ht|$$

| | |
|---|---|
| E1 | Functional value expressing difference in attributes between combined clusters and an inferred physical object |
| Xc | x coordinate of horizontal center position of combined clusters |
| Yc | y coordinate of vertical center position of combined clusters |
| Zc | z coordinate indicating distance of combined clusters |
| Wc | Width of combined clusters |
| Hc | Height of combined clusters |
| Xt | x coordinate of horizontal center position of an inferred physical object |
| Yt | y coordinate of vertical center position of an inferred physical object |
| Zt | z coordinate indicating distance of an inferred physical object |
| Wt | Width of an inferred physical object |
| Ht | Height of inferred physical object |
| C | Constant |

Equation (7) expresses the differences between combined clusters and an inferred physical object as a function of the difference in the center position of combined clusters and an inferred physical object and difference in width and height of combined clusters and an inferred physical object. The distance (Z value) has a tolerance according to the distance value, and is corrected by a value proportional to the distance Zt of the inferred physical object.

In the example shown in FIG. 11, functional values E1 (e01, e02, . . . e31) are calculated for all of the combined clusters 1 through 31 corresponding to the inferred physical object 75. Joint cluster 31 with the smallest functional value E1 is recognized as the physical object 78 (FIG. 10(f)). This is because Joint cluster 31 having the smallest E1 best matches the position and size of the inferred physical object 75.

The clusters C22 through C26 and the inferred physical object 75 are stored with "process completed" flags being set in the cluster memory 15 and inferred object memory 32 respectively. The process performed by the cluster selection part 21, candidate generating part 22 and recognition part 23 is repeated until "processing completed" flags for all the clusters are set.

After the physical object 78 has been recognized, the cluster selection part 21 extracts cluster C21 and clusters C27 through C31 from the cluster memory 15 for which no "processing completed" flags have been set. The cluster selection part 21 extracts the inferred physical object 76 from the inferred object memory 32 for which no "processing completed" flag has been set. The cluster selection part 21 then selects the clusters whose difference in distance from the inferred object 76 is less than the threshold value and that overlap with the inferred object 76 at least partially in the horizontal and vertical positions. As a result, the clusters C27 to C31 are selected.

The candidate generating part 42 determines combined clusters from combinations of the clusters C27 through C31. The recognition part 23 compares the attributes of the respective combined clusters with the attributes of the inferred physical object 76. As a result, the combined clusters consisting of the clusters C27 through C31 is determined to have attributes that are the closest to those of the inferred physical object 76 so that the combined clusters consisting of the clusters C27 through C31 are recognized as a physical object 79 (FIG. 10(f)). The clusters C27 through C31 recognized as a physical object and the corresponding inferred physical object 76 are stored with "processing completed" flags in the cluster memory 15 and inferred physical object memory 32 respectively.

Next, the cluster selection part 21 fetches from the cluster memory 15 the cluster C21 for which no "processing completed" flag has been set. The candidate generating part 22 determines the cluster 21 as a combined cluster and transfers it to the recognition part 23. In this example, all the inferred physical objects have been processed so that the cluster has no corresponding inferred physical object to be compared. The recognition part 23 compares the attributes of the combined cluster with the attributes of predetermined physical objects that are to be detected. The recognition part 23 recognizes that one of the predetermined physical objects that has the smallest difference in the attributes as the physical object corresponding to the combined cluster. Alternatively, a threshold value may be used for deciding that the predetermined physical object whose attributes differ to a small extent such that the difference is smaller than the threshold value represents the physical object.

The attributes of the predetermined physical objects are predetermined and are stored in a memory. For example, if the objects to be detected include vehicles, the attributes of several types of vehicles are stored, and if the objects to be detected include traffic signs, the attributes of several types of traffic signs are stored. In this embodiment, width and height are used as the attributes that are compared. Equation (8) shown below is used for the comparison of attributes. The meanings of the variables in Equation (8) are shown in Table 2. Equation (8) expresses the difference in attributes of combined clusters and a predetermined object as a function based on difference in width and height of combined clusters and a predetermined object.

TABLE 2

$$E2 = |Wc - Wt| + |Hc - Ht| \quad \text{[Equation 8]}$$

| | |
|---|---|
| E2 | Functional value expressing difference in the attributes of combined clusters and a predetermined physical object |
| Wc | Width of combined clusters |
| Hc | Height of combined clusters |
| Wt | Width of a predetermined physical object |
| Ht | Height of a predetermined physical object |

The recognition part 23 compares the attributes of the combined cluster consisting of the cluster C21 extracted by the candidate generating part 22 with the attributes of several predetermined physical objects to be detected, and determines the predetermined object to be detected that has the smallest functional value E2. Thus, the cluster C21 is recognized as a physical object 77 (FIG. 10(*f*)).

If there are two or more clusters that do not have any corresponding inferred object, the cluster selection part 21 should preferably group clusters whose differences in distances and horizontal and vertical positions are within predetermined ranges into a cluster group and treat them as a group in subsequent processing. This is to avoid erroneous object recognition which may be caused, for example, by combining two clusters located away from each other horizontally.

If any inferred object still remains when all clusters have been processed, the cluster selection part 21 determines that this inferred object no longer appears in the image area and may delete it from the inferred object memory 32.

After recognizing an object, the physical object recognition part 23 stores the attributes of objects recognized in the current cycle in the object memory 25. Furthermore, the physical object recognition part 23 uses the distances of the object recognized in the previous cycle and the object recognized in the current cycle and calculates the relative speed of the vehicle with respect to the physical object based on a value determined from the calculation formula: (current distance−previous distance)/detection time interval. The recognition part 23 stores the relative speed in the object memory 25. As described above, the detection time interval is the time difference between the previous measurement and the current measurement, and can be set, for example, at 60 to 100 milliseconds.

Vehicle Control

The vehicle controller 45 checks whether a failed status flag is set in the failure memory 16. If the failed status flag is set, the image captured in the current cycle is in a failed state and the vehicle controller 45 disables the vehicle control based on the results of processing run by the physical object recognition part 23. In that case, the vehicle controller 45 may notify the driver of the failed state.

Conversely, if a failed status flag is not set, the vehicle mounting the system is controlled based on the results of processing run by the physical object recognition part 23. The vehicle controller 45 may control the vehicle to maintain a proper distance to the physical objects based on the information such as objects' positions and relative speeds stored in the object memory 25 as well as on the information received from a vehicle speed detection device 46 and a yaw rate detection device 47.

For example, the vehicle controller 45 can activate a warning device to warn the driver of too close an approach to the vehicle ahead, or can send a signal to an ECU (electronic control unit) and a brake control unit to brake the vehicle forcefully. At the same time, the vehicle controller 45 can determine the travel area of the vehicle and control the vehicle to maintain a proper distance to the physical objects based on speed data of the vehicle received from the vehicle speed detection device 46 and a yaw rate signal received from the yaw rate detection device 47.

To ensure recognition of objects, it is preferable that the vehicle controller 45 controls the vehicle only when the same object is recognized a predetermined number of times in a row by checking the identity of previously recognized and currently recognized objects. The reliability of recognition can be improved by using the results obtained from two or three cycles of recognition processing.

In the embodiment described above, the sequence of object recognition processes is performed in parallel with the failure detection process performed by the failure detector 14. Alternatively, it is possible to start running the sequence of object recognition processes if the failure detector 14 finds no failed state and to stop the processing of object recognition if the failure detector 14 finds a failed state. In that case, the physical object recognition part 23 (or possibly, cluster selection part 21 or candidate generating part 22) checks whether a failed status flag is set in the failure memory 16. If the flag is set, the subsequent processing of the given image is prohibited in the current cycle.

The correlation calculating part 6, distance measurement part 7, distance memory 8, window cut-out part 13, distance conversion table 9, clustering part 11, cluster memory 15, cluster judging part 12, physical object memory 25, physical object inferring part 31, cluster selection part 21, candidate generating part 22, physical object recognition part 23, inferred physical object memory 32, and vehicle controller 45 can be implemented by a micro-controller which typically includes a central processing unit (CPU), a read-only memory (ROM) containing control programs and data and a random-access memory (RAM) providing an working area for the CPU and temporary storage for various data. In other words, computer programs stored in the ROM implements the above-described functions of the functional blocks shown in FIG. 1.

The distance memory 8, distance conversion table 9, cluster memory 15, inferred physical object memory 32, and physical object memory 25 may be realized using different memory areas of a single RAM. Temporary storage areas for data required in various types of operations may also be provided by portions of the same RAM.

The object recognition device of the present invention may be LAN-connected with an engine electronic control unit (ECU), brake-control ECU and other ECU, and the output from this object recognition device can be used for overall control of the vehicle.

What is claimed is:

1. An object recognition system having at least two image sensors and a controller that is adapted for measuring distance from the system to a physical object with respect to respective windows of an image captured by the sensors, wherein said controller is programmed to form clusters by uniting adjacent windows that have similar measured distances, judge whether each of the clusters is valid or invalid based on the attributes of the cluster, recognize the physical object based on the clusters judged to be valid;

detect a failed state of the captured image based on the number of clusters judged to be invalid or based on a ratio of the number of clusters judged to be invalid to the total number of clusters contained in the captured image; and disable performing the recognition of the physical object or performing control based on the recognized physical object if the failed state is detected.

2. The system of claim 1, wherein the attributes of the cluster include an area of the cluster, and
wherein said controller is programmed to calculate an area of the cluster based on the number of windows contained in the cluster and measured distance of each of the windows, and to judge that the cluster is valid if the area is larger than a predetermined threshold value.

3. The system of claim 2, wherein the area A of the cluster is calculated according to the following equation:

$$A = \frac{\mu_h \mu_v}{f^2} D_{ave}^2 N$$

where $\mu_h$ is the horizontal length of a window, $\mu_v$ is the vertical length of the window, $D_{ave}$ is the average of the measured distances of windows forming the cluster, N is the number of the windows forming the cluster, and f is the focal length.

4. The system of claim 1, wherein the attributes of the cluster include the number of windows contained in the cluster, and
wherein said controller is programmed to judge that the cluster is valid if the number of windows contained in the cluster is larger than a threshold value that is predetermined according to the measured distances of the windows contained in the cluster.

5. The system of claim 4, wherein the threshold value $N_o$ is calculated according to the following equation:

$$N_0 = \frac{f^2}{\mu_h \mu_v D^2} A_0$$

where $A_0$ is a predetermined threshold value for the area of the cluster, $\mu_h$ is the horizontal length of a window, $\mu_v$ is the vertical length of the window, D is the measured distance of the cluster, and f is the focal length of a lens installed in the image sensor.

6. A method for recognizing a physical object in front of a vehicle, comprising:
capturing an image in front of the vehicle;
measuring distance from the vehicle to the physical object with respect to respective windows of the captured image;
uniting adjacent windows that have similar measured distances to form clusters;
judging whether each of the clusters is valid or invalid based on attributes of the cluster;
recognizing the physical object based on the clusters judged to be valid;
detecting a failed state of the captured image based on the number of clusters judged to be invalid or based on a ratio of the number of clusters judged to be invalid to the total number of clusters contained in the captured image; and
disabling performing the recognition of the physical object or performing control based on the recognized physical object if the failed state is detected.

7. The method of claim 6, wherein the attributes of the cluster include the area of the cluster, and
wherein the step of judging includes calculating an area of the cluster based on the number of windows contained in the cluster and measured distance of each of the windows, and judging that the cluster is valid if the area is larger than a predetermined threshold value.

8. The method of claim 6, wherein the attributes of the cluster include the number of windows contained in the cluster, and
wherein said step of judging includes judging that the cluster is valid if the number of windows contained in the cluster is larger than a threshold value that is predetermined according to the measured distances of the windows contained in the cluster.

* * * * *